(12) United States Patent
Lynum et al.

(10) Patent No.: US 7,462,343 B2
(45) Date of Patent: Dec. 9, 2008

(54) MICRO-DOMAIN GRAPHITIC MATERIALS AND METHOD FOR PRODUCING THE SAME

(75) Inventors: Steinar Lynum, Oslo (NO); Jan Hugdahl, Trondheim (NO); Ketil Hox, Trondheim (NO); Ragne Hildrum, Oslo (NO); Magne Nordvik, Finnstadjordet (NO)

(73) Assignee: Kvafrner Technology and Research Ltd., London (GB)

( * ) Notice: Subject to any disclaimer, the term of this patent is extended or adjusted under 35 U.S.C. 154(b) by 1350 days.

(21) Appl. No.: 10/277,134

(22) Filed: Oct. 22, 2002

(65) Prior Publication Data

US 2003/0091495 A1  May 15, 2003

Related U.S. Application Data

(63) Continuation-in-part of application No. 09/400,530, filed on Sep. 21, 1999, now abandoned.

(51) Int. Cl.
*C01B 31/02* (2006.01)
(52) U.S. Cl. .................... 423/445 R; 204/173; 977/844
(58) Field of Classification Search ............. 423/445 R; 204/173; 977/844
See application file for complete search history.

(56) References Cited

U.S. PATENT DOCUMENTS 6,099,696 A * 8/2000 Schwob et al. .............. 204/173

FOREIGN PATENT DOCUMENTS

| NO | 176522 | 1/1995 |
|----|--------|--------|
| WO | WO 93/20152 | 10/1993 |
| WO | WO 93/23331 | 11/1993 |
| WO | WO 94/17908 | 8/1994 |
| WO | WO 95/26925 | 10/1995 |

OTHER PUBLICATIONS

Atomic Force Microscopy of Carbon Nanotubes, L1, Nov. 28, 1994.
Three-Dimensional Morphology And Microstructures of Graphite Shells, Vincent, 1993.
Solid C60, Huffman, Nov. 1991 Physics Today p. 22-29 (p. 26 missing).
Carbon Nanotubes, Ebbesen, Jun. 1996 Physics Today p. 26-32.
Hydrogenation of Fullerenes C60 And C70 In The Presence . . . , Tarasov, 1997.
Formation of Carbon Nanofibers, Endo, 1992.
Carbon Arc Generation of C60, Haufler, 1991.
Observation o fullerene Cones, Ge, Apr. 1, 1994.

* cited by examiner

*Primary Examiner*—Stuart Hendrickson
(74) *Attorney, Agent, or Firm*—Jeffrey S. Melcher; Manelli Denison & Selter, PLLC (57) ABSTRACT

This invention relates to a method for producing micro-domain graphitic materials by use of a plasma process, and to novel micro-conical graphitic materials. By micro-domain graphitic material we mean fullerenes, carbon nanotubes, open conical carbon structures (also named micro-cones), preferably flat graphitic sheets, or a mixture of two or all of these. The novel carbon material is open carbon micro-cones with total disclination degrees of 60° and/or 120°, corresponding to cone angles of respectively 112.9° and/or 83.6°.

20 Claims, 8 Drawing Sheets

MICRO-DOMAIN GRAPHITIC MATERIALS AND METHOD FOR PRODUCING THE SAME

This application is a continuation-in-part of prior application Ser. No. 09/400,530 filed Sep. 21, 1999 now abandoned.

FIELD OF THE INVENTION

This invention relates to a method for producing micro-domain graphitic materials by use of a plasma process, and for producing novel micro-conical graphitic materials. By micro-domain graphitic materials we mean fullerenes, carbon nanotubes, open conical carbon structures (also named micro-cones), preferably flat graphitic sheets, or a mixture of two or all of these. The novel carbon material is open carbon micro-cones with total disclination degrees 60° and/or 120°, corresponding to cone angles of respectively 112.9° and/or 83.6°.

BACKGROUND OF THE INVENTION

There is currently an intense interest in novel carbon materials due to their unique and novel properties. For instance, the carbon materials may be useful to achieve high hydrogen energy storage, for use in purification processes as well as for different applications within the electrical/pharmaceutical sector. The properties are sensitive to the micro-structure of the carbon material, which can be varied by the degree of graphitisation and by introduction of rings other than hexagons in the network. Fullerenes are examples of novel graphitic structures where the introduction of a 12 pentagons in the hexagonal network results in closed shells (D. Huffman, Physics Today, p. 22, 1991). Carbon nanotubes are also an example of such possibilities (T. W. Ebbesen, Physics Today, p. 26, 1996). Open conical structures are yet another example of possible graphitic structures, but only three of five possible kinds have ever been synthesized (M. Ge and K. Sattler, Chemical Physics Letters, 220, P. 192, 1994; P. Li and K. Sattler, Mat. Res. Soc. Symp. Proc. 359, p. 87, 1995; R. Vincent, N. Burton, P. M. Lister and J. D. Wright, Inst. Phys, Conf. Ser. 138, p. 83, 1993).

Recent interest in fullerenes and nanotubes is amongst other connected to their use in the field of hydrogen storage. Hence, Fernando tubes a hydrogen storage of amazingly 75 wt % is reported (Hydrogen & Fuel Cell Letter, vol. 7/No. 2, February 1997) If this is the case, it will probably represent the break-through concerning a practical hydrogen storage system for use in the transportation sector. It is indicated that future fuel cell cars using this storage technology may achieve a range of about 8000 km.

In the case of fullerenes, more than 7 wt % of reversibly added hydrogen is achieved (R. M. Baum, Chem. Eng. News, 22, p. 8, 1993; Japanese Patent JP 27801 A2, Fullerene-based hydrogen storage media, 18,Aug. 1994; A. Hirsch, Chemistry of Fullerenes, Thieme Ferlag, Stuttgart, Ch. 5, p. 117, 1994). Fullerenes have also been used in a solid phase mixture with inter-metallic compounds or metals to achieve high contents of hydrogen, i.e. 24-26 H atoms per fullerenes molecule (B. P. Tarasov, V. N. Fokin, A. P. Moravsky, Y. M. Shul'ga, V. A. Yartys, Journal of Alloys and Compounds 153-254, p. 25, 1997). Flat graphitic material formed of stacks of two-guy mention sheets has high surface area of for adsorption of guest elements and compounds. However, in such materials, the absorption process is limited by diffusion. The larger the graphitic domain, the slower the adsorption will be. Of potential interest would be highly graphitic eyes to materials where domains were small so that the guest material would readily reach all the graphitic micro domains by percolation through the bulk carbon material. The accessibility to the micro-domains could be further enhanced if some or all the domain is had been topple logical discrimination, preferably each domain having less or equal man 300 degrees disk letter nation to provide cavities, or micro-pores, for the flow of guest material.

A common problem with the present methods for synthesizing peas and graphitic materials is the little production yield. The fullerenes are most often synthesized by vapor rising graphite electrodes via carbon—are discharges in a reduced inner against atmosphere. There has been reported a conversion rate into fullerenes of 10-15%, corresponding to a generation rate of nearly 10 grams per hour (A. Hirsch, Chemistry of Fullerenes, Thieme Ferlag, Stuttgart, Ch. 5, p. 117, 1994).

The carbon-arc method is also the most frequently used method for production of carbon nanotubes. Nanotubes yields of about 60% of the core material have been obtained at optimal conditions (T. W. Ebbesen, Physics Today, p. 26, 1996). Still, the achieved yield is in gram quantities.

Small unspecified amount of open conical carbon and structures are obtained by resistively heating a carbon foil and further condensing the carbon vapor on a highly-oriented pyrolytic graphite surface (M. Ge and K. Sattler, Chemical Physics Letters, 220, P. 192, 1994; P. Li and K. Sattler, Mat. Res. Soc. Symp. Proc. 359, p. 87, 1995). The code angles produced by this method did was approximately 19° as well as 60° (P. Li and K. Sattler, Mat. Res. Soc. Symp. Proc. 359, p. 87, 1995). Resistive heating of a carbon rod, with further deposition on cooler surfaces was used to produce cones with apparent cone angles of approximately 39° (R. Vincent, N. Burton, P. M. Lister and J. D. Wright, Inst. Phys, Conf. Ser. 138, p. 83, 1993). It can be shown from a continuous sheet of graphite that only five types of cones can be assembled, where each domain is uniquely defined by its topological disclination TD given by the general formula:

$$TD = N \times 60 \text{ degrees, where } N = 0, 1, 2, 3, 4 \text{ or } 5.$$

As used herein, the term "disclination" is defined as "a line defect arising from singularities in orientational order in a directional field", which serves for further growth giving rotational symmetry. With respect to graphitic cones, these are created when a perfect graphitic plane with hexagons are interrupted by one or more pentagons. This results in a rotational fixture of the graphitic plane resulting in the start point of the cone, further symmetrical growth can follow from this. The disclination is defined to be the deviation angle from the hexagonal to a pentagon, that is 60° for 2 to 5 pentagons.

The structure of such graphitic domains can be grossly described as stacks of graphitic sheets with flat ($N=0$) or conical structures ($N=1$ to 5). Hence, two of these, holding cone angles of 83.6° and 112.9°, have not been reported so far.

SUMMARY OF THE INVENTION

An object of this invention is to provide a novel method for producing micro-domain graphitised materials. The method can give large yield rates, up to above 90%.

Another object of this invention is to provide a method that is suited for industrial scale production of micro-domain graphitised materials. Further, it is an object of this invention to provide a method that can produce a micro-domain graphitised materials which at least partly consists of a novel highly crystalline graphitic material composed of open conical carbon structures holding cone angles of 83.6° and 112.9°. This corresponds to $N=1$ and 2. The rest of the micro-conical graphitised materials are either fullerenes, carbon nanotubes, the other open carbon cones (N=3, 4, or 5), preferably flat graphitic sheets (N=0), or a mixture of two or more of these.

DETAILED DESCRIPTION OF THE EXEMPLARY EMBODIMENT

The invention is based upon decomposition of hydrocarbons into carbon and hydrogen in a plasma based process. The plasma are is formed in a plasma generator which consists of tubular electrodes, wherein the inner electrode is supplied with electrical direct voltage with one polarity and wherein the external electrode is connected to the opposite polarity from a power supply. The plasma generator is installed in connection with a decomposition reactor wherein the reactor is designed as a defined heat insulated chamber with an outlet for end products. The plasma gas is recycled from the process. Further description of the general process and the equipment is described in the applicant's Norwegian patent No. 176522.

The structure of the resulting carbon material will depend on the following three process parameters: The hydrocarbon feed rate, the plasma gas enthalpy and the residence time. By varying these parameters the resulting carbon material will either be available as conventional carbon black, as micro-domain graphitic materials or a mixture of both. In this invention we will describe the process parameters for optimizing on micro-domain graphitic materials.

The hydrocarbons are introduced into a decomposition reactor and heated by a plasma gas in the vicinity of the plasma arc zone by use of a nozzle. The nozzle aligns the hydrocarbon spay in the axial direction of the reactor and is designed in such a way that coarse drops are formed. This is to prevail the hydrocarbon evaporation in such a way that the hydrocarbons start the cracking and polymerization process, which results in the formation of polycyclic aromatic hydrocarbons (PAHs). That is, the plasma gas enthalpy is controlled at such a level that the main fraction of the gaseous hydrocarbons does not reach the pyrolysis temperature at the specific speed rate and resistance time used. However, a small fraction of the gaseous hydrocarbons will inevitably reach the pyrolysis temperature and consequently react and convert to conventional carbon black.

The impurity fraction of carbon black would naturally be kept as low as possible, and is further, together with the wanted graphitic micro-domains, separated from the process gas containing the gaseous hydrocarbons (PAHs) by conventional filtering after exiting the reactor. A conventional filtering of a gas stream is assumed known to a skilled person and will not be further described here.

After the filtering of the process gas, the fraction of the process gas that contains the PAHs is reintroduced into the plasma torch once more as the plasma gas. When entering and going through the high energy intensive plasma arc zone of the plasma torch the second time, the gaseous PAHs will be fully converted to graphitic micro-domains. These micro-domains successively follow the heated plasma gas to the low temperature zone of the reactor and follow the process gas as explained above to the filter to be recovered as the product.

Figure 1:
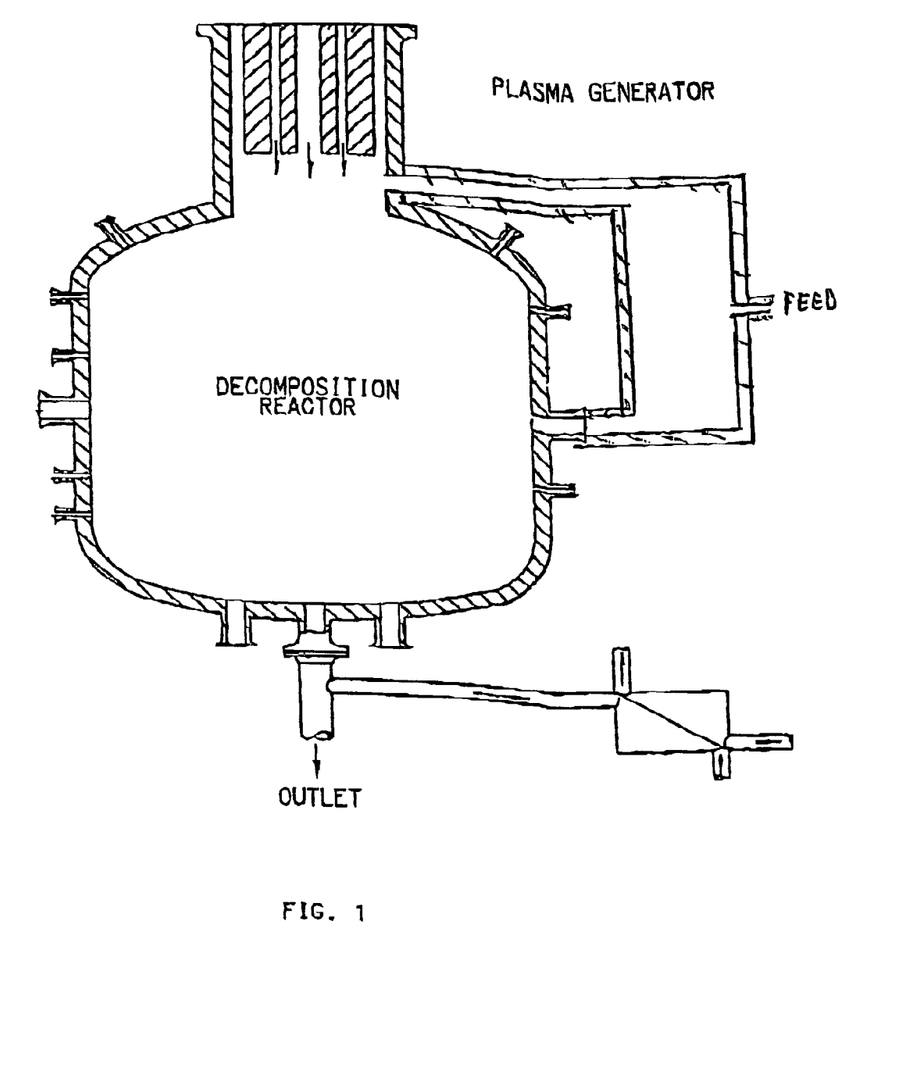
FIG. 1 shows a schematic figure of the reactor and the surrounding equipment.

The reintroduction of the PAH-containing plasma gas can of course be performed by a recirculation loop (such as shown in FIG. 1) or by having two plasma reactors connected in series. These modifications are considered to be within skill of those in the art and within the spirit and scope of the claims. FIG. 1 shows an example of how to obtain two reaction chambers in one plasma reactor where the side chamber has a lower temperature than the main chamber, such that the first step as defined above is performed in the side chamber and the second step is performed in the main chamber before the product is taken out through the outlet at the bottom of the reactor.

Energy is supplied from the plasma are to heat the plasma gas. Some of the energy from the arc will be used to heat the surrounding reactor walls as well as the plasma generator itself. The resulting energy content of the plasma gas (the plasma gas enthalpy) is sufficient to evaporate the hydrocarbons. The hydrocarbons start a cracking and polymerization process, which results in the formation of polycycfic aromatic hydrocarbons (PAHs). The PAHs are the basis of graphitic sheets forming the micro-domains. The plasma gas enthalpy is kept at such a level that the main fraction of the gaseous hydrocarbons does not reach pyrolysis temperatures at the specified feed rate and residence time used. However, a small fraction of the feedstock will inevitably achieve sufficient energy during the residence time in the reactor to reach pyrolysis temperature and is consequently converted to conventional carbon black. This fraction should be kept as low as possible.

The PAHs leaves the reactor along with the plasma gas and is once more introduced in the reactor as a part of the plasma gas. The plasma gas enters the energy intensive plasma arc zone, wherein the PAHs during a fraction of a second are converted to graphitic micro-domains.

The feedstock feed rate for optimizing on graphitic micro-domain materials is in the range of 50-150 kg/h in a reactor employed by the inventor, but is not limited by this range. Both lower and higher feedstock feed rates might be used. The yield of the graphitic micro-domain material is better than 90% under optimal conditions. At least 10 percent of these domains have total disclinations larger than 60". Taken into account the feedstock feed rate utilized, industrial amounts of micro-domain carbon material is achieved. By further up-scaling this will result in a price which is on the same level as commercial carbon black per unit weight of the material.

FIG. 1 shows a schematic drawing of the reactor. Further details concerning the reactor and the surrounding equipment are described in the applicant's Norwegian patent No. 176511.

Figure 2:
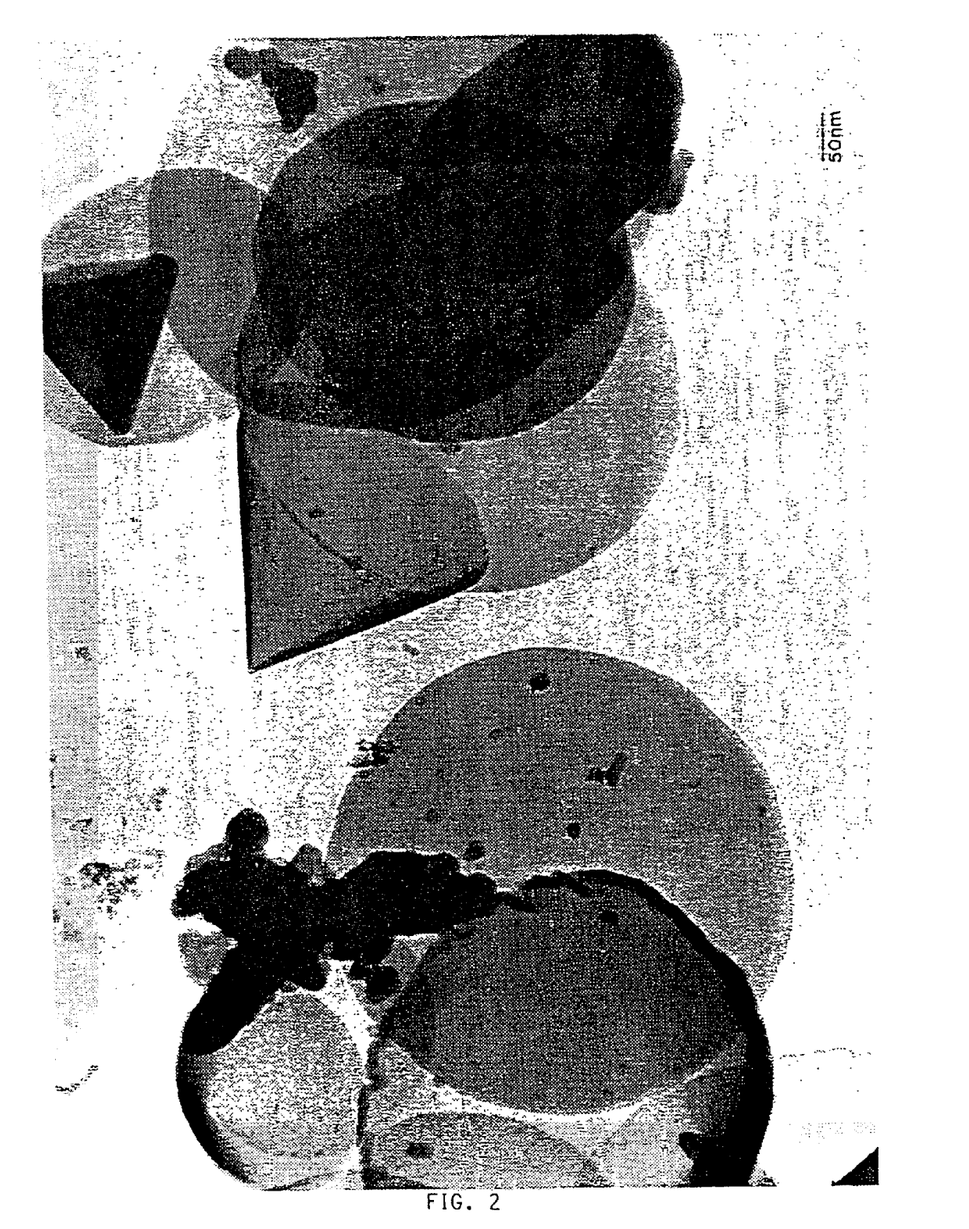
FIG. 2 shows a transmission electron microscope photograph of the samples revealing the various types of open micro-conical carbons of the invention.
Figure 3:
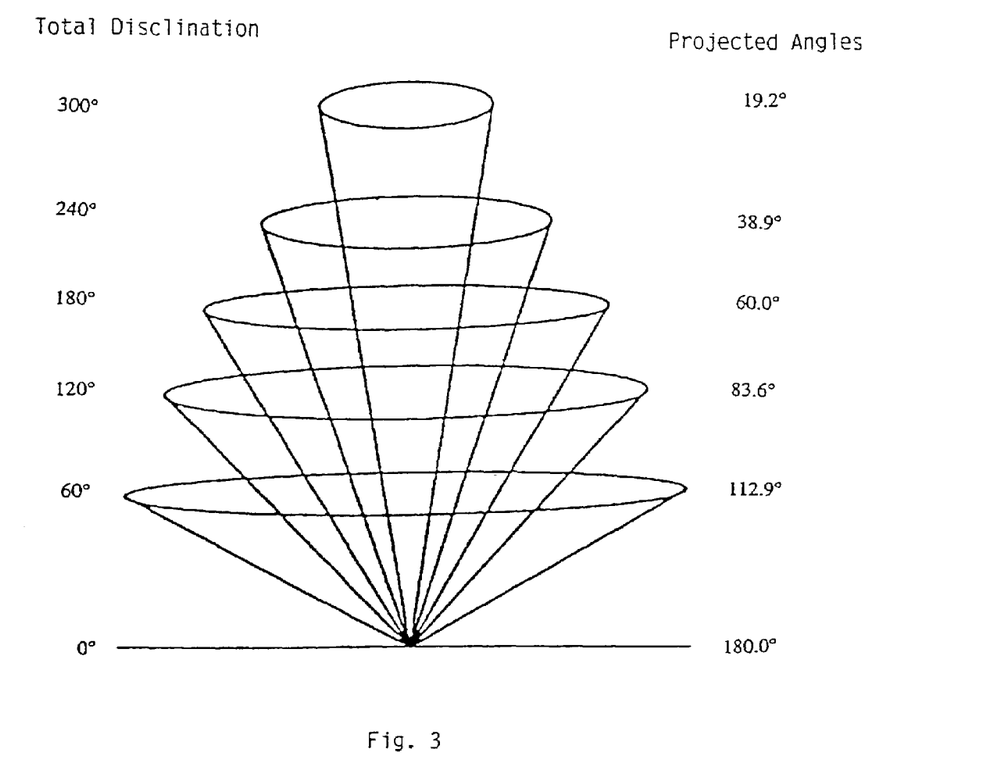
FIG. 3 shows the projected angles for perfect graphitic cones, i.e. 19.2°, 38.9°, 60°, 83.6° and 112.9°, which represents total disclination of 300°, 240°, 180°, 120° and 60°, respectively. In addition a graphitic sheet, having a projected angle of 180° and a total disclination of 0°, is shown.
Figure 4A:
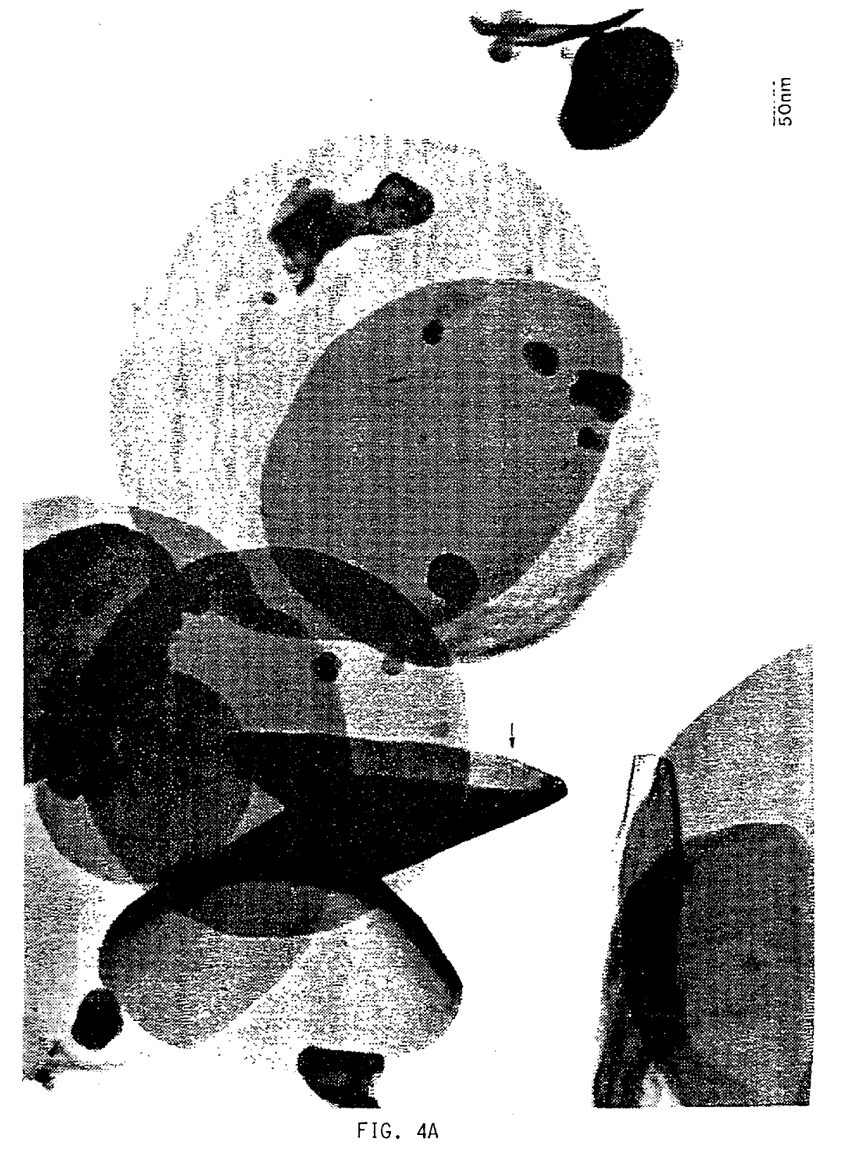
FIGS. 4A, 4B, 4C, 4D and 4E shows example of domains for each type of disclination 60°, 120°, 180°, 240° and 300°, respectively, present in the invention.
Figure 4B:
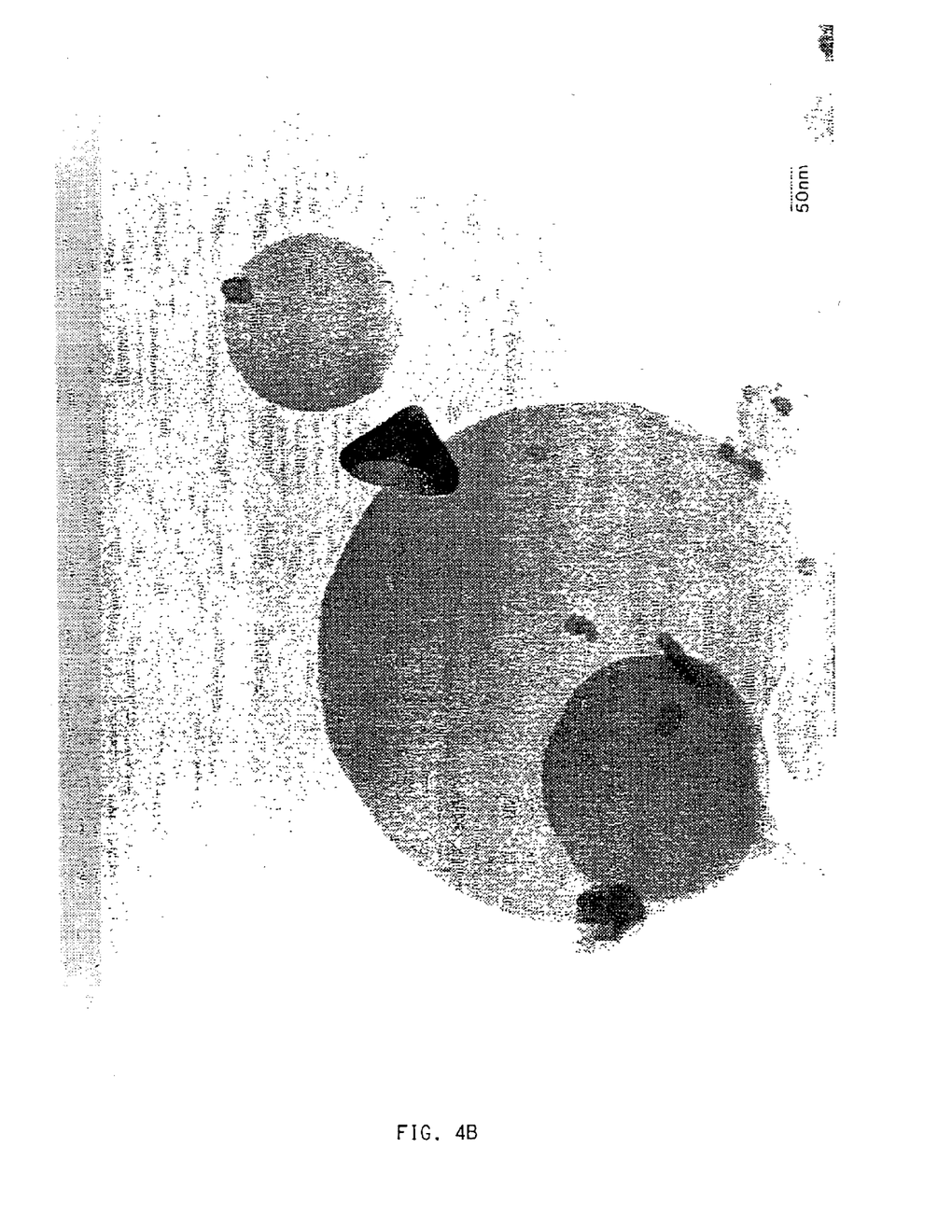
Figure 4C:
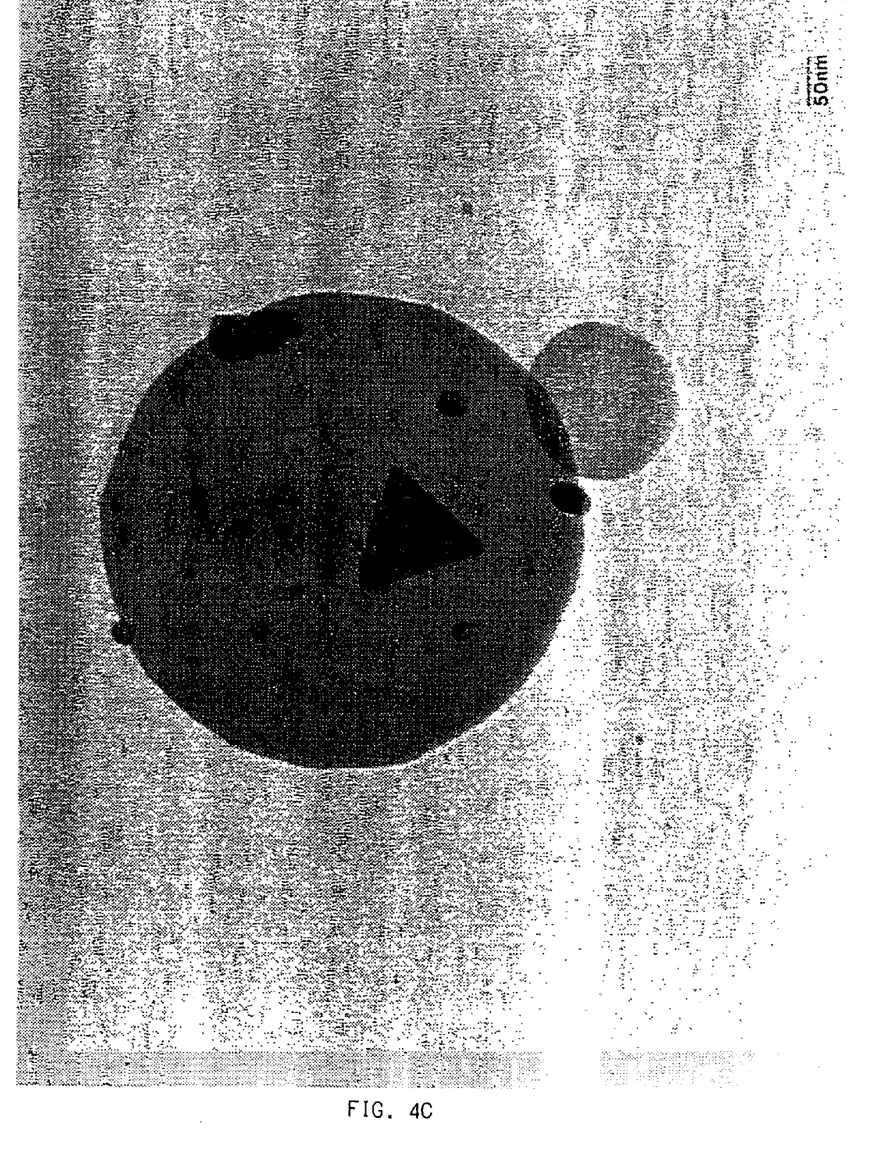
Figure 4D:
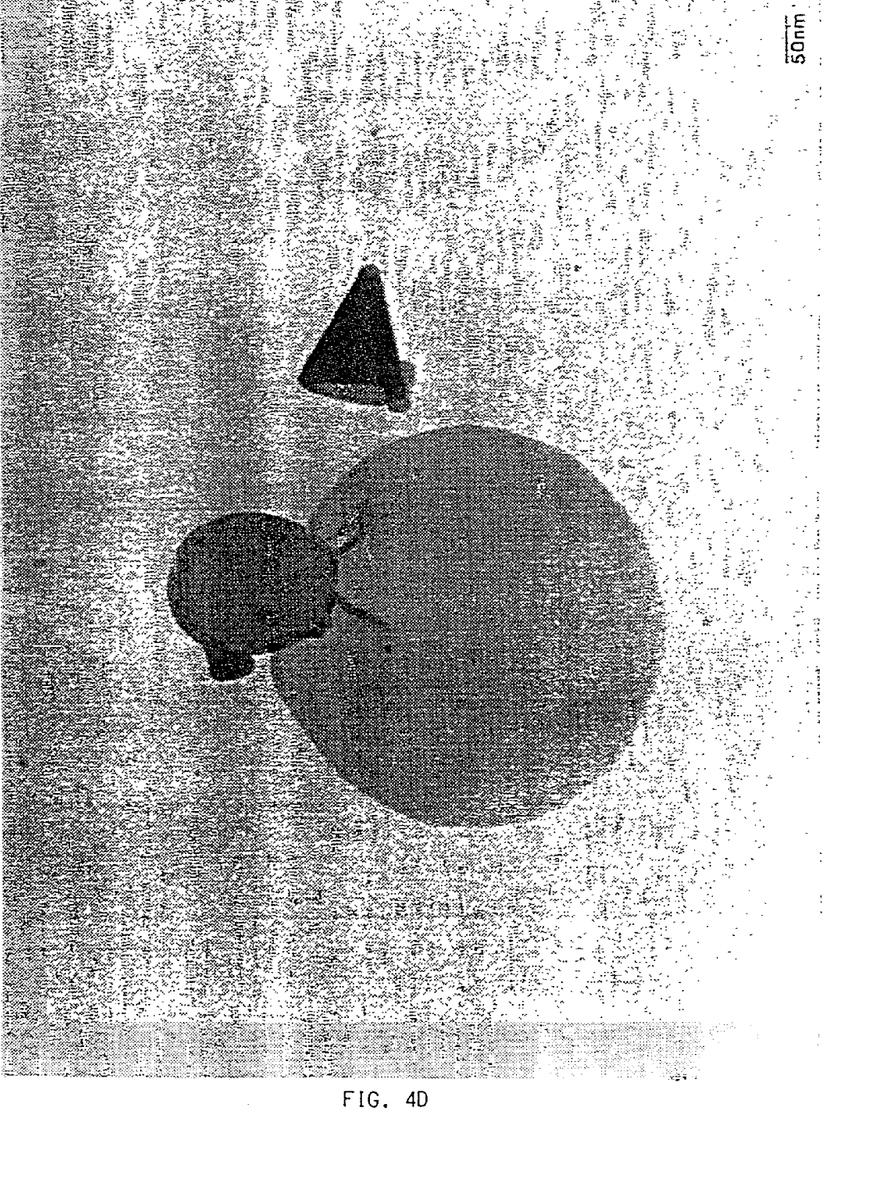
Figure 4E:
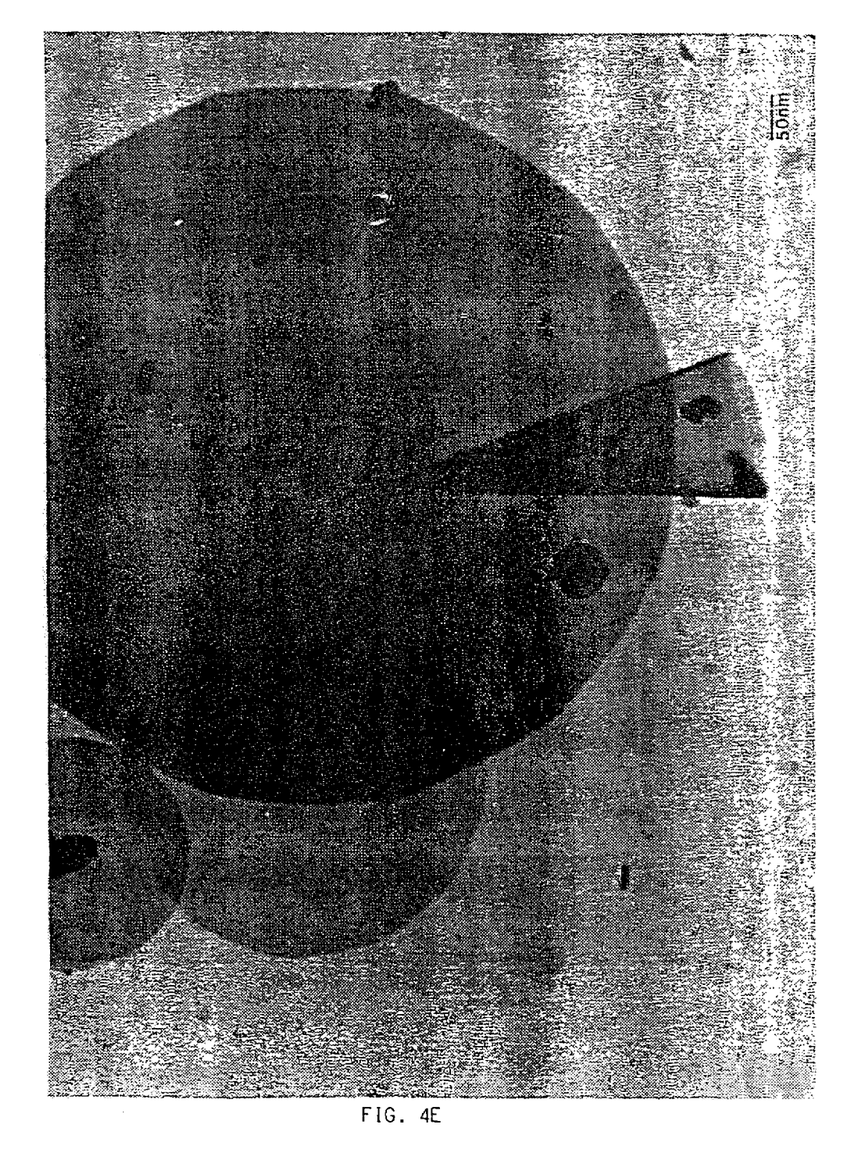

FIG. 2 shows a typical example of the content of the micro-domain material. Each piece in the sample forms a single graphitic domain and the alignment of the sheets in each domain is typically turbostratic, as determined from electron microscopy. The diameter of the domains is typically less than 5 micrometers and the thickness less than 100 nanometers. If a cone is made up of an uninterrupted sheet of graphite, except at the open edge, the only five possible types are possible due to the symmetry of graphite. These correspond to a total disclination of 60°, 120°, 180°, 240° and 300°. A total disclination of 0° corresponds to a flat domain. FIG. 3 shows schematically the projected angles of these structures. Examples of each of these types of domains are shown in FIGS. 4A, 4B, 4C, 4D and 4E. It is important to notice that all the cones are closed in the apex. The conical domains represent at least 10% of the material. The material of this invention consist of micro-domains of graphite of well-defined total disclinations TD (curvature), which have discrete values given by the formula $TD=N\times 60$ degrees, where $N$=0, 1, 2, 3, 4 or 5, and corresponds to the effective number of pentagons necessary to produce the particular total disclination.

The results the process is based on indicate that the total disclination nearly always is determined in the nucleation stage. It is earlier found that the probability of forming pentagons in the seed depends on the temperature (M. Endo and H. W. Kroto, J. Phys. Chem. 96, p. 6941, 1992). Hence, by varying the process parameters, the number of pentagons in the seed may increase, resulting in formation on nanotubes or closed shells.

The small size of the domains and the presence of various disclinations in the graphitic material produced in the present invention are useful for the incorporation of guest elements and compounds. The space between the domains will provide micro-pores for the flow of guest material so that it can reach each domain. The small size of the domains will allow rapid diffusion of guest material in and out of each layer composing them.

The invention will be illustrated in more detail with reference to the following examples, which should not be construed to be limiting in scope of the present invention. In Example I, the process parameters are chosen in such a way that conventional carbon black is formed at the first (and only) cycle of hydrocarbons through the reactor. By varying the feedstock feed rate, the plasma gas enthalpy and the residence time, it is shown in Example 2 that at the second cycle through the reactor, micro-domain graphitic materials can be produced from PAHs formed in the first cycle.

EXAMPLE 1

Heavy fuel oil was heated to 1600° C. and introduced in the reactor by use of the self-invented axial aligned nozzle at a feed rate of 67 kg per hour. The reactor pressure was kept at 2 bar. Hydrogen was employed as plasma gas, and the plasma gas feed rate was 350 Nm$^3$/h, while the gross power supply from the plasma generator was 620 kW. This resulted in a plasma gas enthalpy of 1.8 kWh/Nm3 $H_2$. The time elapsed from the atomized oil was introduced until the product left the reactor was approximately 0.23 seconds.

The resulting carbon black was traditional amorphous of N-7xx quality. The volatile content of the carbon black was measured to 0.6%.

EXAMPLE 2

In this example the oil feed rate, the hydrogen plasma gas enthalpy as well as the residence time was tuned in such a direction that the evaporated hydrocarbons did not achieve pyrolysis temperature during the first cycle. The residence time of the hydrocarbons during the first cycle through the reactor was minimized by increasing the oil and plasma gas feed rate.

Heavy fuel oil was heated to 160° C. and introduced in the reactor by use of the self-invented axial aligned nozzle at a feed rate of 115 kg per hour. The reactor pressure was kept at 2 bar. The hydrogen plasma gas feed rate was 450 Nm$^3$/h, while the gross power of supply from the plasma generator was 1005 kW. This resulted in plasma gas enthalpy of 2.2 kWh/Nm$^3$H$_2$. The time elapsed from the oil was introduced until the PAHs left the reactor was approximately 0.16 seconds.

The resulting PAHs were reintroduced into the reactor in the plasma-arc zone to produce a micro-domain graphitic material, with a yield higher than 90%. The volatile content of the carbon material was measured to 0.7%. All other process parameters were the same as for the first cycle.

Although in the example of the method has been described as a conversion of heavy oil to a micro-domain graphitic material, it should be understood that the method can be applied for all hydrocarbons, both liquid and gaseous. Also, the method may be performed as a batch or continuous production, with one or more plasma reactors in series etc. In the case where the PAHs formed in the first decomposition step is reintroduced into the same plasma reactor, the micro-domain graphitic materials formed in the second decomposition step are of course separated from the PAHs by any conventional suited means. This may be by filtering, cyclones etc.

Further, any gas that is inert and do not pollute the micro-domain graphitic products may be used as plasma gas, but hydrogen is specially suited since this element is present in the feedstock. The plasma gas may be recycled back into the reactor, if desired. It is also possible to employ the present method by introducing additional hydrocarbons through inlets at the sides of the decomposition reactor to control the temperature in the decomposition zone and/or to increase the yield, see the applicant's Norwegian patent No. 176522.

What is claimed is:

1. A method for the production of micro-domain graphitic materials by decomposition of a hydrocarbon fuel in a plasma reactor comprising a decomposition chamber connected to a plasma generator, wherein the plasma reactor is fed with $H_2$ as the plasma forming gas, wherein the hydrocarbon fuel is decomposed in a two-step process wherein the hydrocarbons are subjected to a first decomposition step, including the steps of feeding the hydrocarbon fuel into the decomposition chamber in the vicinity of the plasma arc zone and mixing the hydrocarbon fuel with the plasma gas, and wherein the process parameters are adjusted in such a manner that the hydrocarbon fuel does not reach pyrolysis temperature and is only partially decomposed to form polycyclic aromatic hydrocarbons, and the step of mixing the hydrocarbon fuel in the form of polycyclic aromatic hydrocarbons, after the first decomposition step, with the plasma gas and reintroducing the polycyclic aromatic hydrocarbons as a part of the plasma gas into the plasma arc zone in the decomposition chamber and subjecting the polycyclic aromatic hydrocarbons to a second decomposition step, wherein the process parameters are adjusted in such a manner that the heat in the plasma arc zone causes the polycyclic aromatic hydrocarbons to be fully converted into micro-domain graphitic materials.

2. A method according to claim 1, wherein a reaction chamber comprises the decomposition chamber, the reaction chamber is constructed as an insulated chamber having outlets at one end for removing the micro-domain graphitic materials and is connected to a plasma torch at another end.

3. A method according to claim 1, wherein the micro-domain graphitic materials consist of at least one of the materials chosen from the group consisting of carbon nanotubes, fullerenes, carbon micro-cones, and flat graphitic carbon sheets.

4. A method according to claim 3, wherein the domain size is smaller than 5 μm in diameter parallel to the graphitic stacking direction and having a thickness of less than the 100 nm in their graphitic stacking direction.

5. A method according to claim 1, wherein the conversion rate of hydrocarbons into micro-domain graphitic materials is in the range from 0 to about 90%.

6. A method according to claim 1, wherein the conversion rate of hydrocarbons into micro-domain graphitic materials is about 90%.

7. A method according to claim 1, wherein the conversion rate of hydrocarbons into micro-domain graphitic materials is about 50 kg per hour.

8. A method according to claim 1, wherein the conversion rate of hydrocarbons into micro-domain graphitic materials is about 100 kg per hour.

9. A method according to claim 1, wherein the conversion rate of hydrocarbons into micro-domain graphitic materials is about 150 kg per hour.

10. A method according to claim 1, wherein at least 10% of the produced micro-domain graphitic materials is open carbon micro-cones with total disclination larger than 60°.

11. A method according to claim 1, wherein the method employs heavy fuel oil as the hydrocarbon feed for conversion into micro-domain graphitic materials.

12. A method according to claim 1, wherein the two decomposition steps are carried out by passing the material through two plasma reactors connected in series.

13. A method according to claim 1, wherein the method employs fuel oil as hydrocarbon fed for conversion into micro-domain graphitic materials.

14. A method for the production of micro-domain graphitic materials in a plasma reactor comprising:
feeding a hydrocarbon fuel into a decomposition chamber of a plasma reactor in a vicinity of a plasma arc zone and heating the hydrocarbon with a plasma gas;
decomposing the hydrocarbon fuel in the plasma reactor under conditions such that a main fraction of hydrocarbons in the plasma reactor does not reach pyrolysis temperature and is partially decomposed to form polycyclic aromatic hydrocarbons;
removing the polycyclic aromatic hydrocarbons from the plasma reactor;
feeding the polycyclic hydrocarbons to the plasma reactor as at least part of the plasma gas or feeding the polycyclic hydrocarbons to another plasma reactor as at least part of a plasma gas and decomposing the polycyclic aromatic hydrocarbons under conditions such that the polycyclic aromatic hydrocarbons are fully converted into micro-domain graphitic materials; and
removing the micro-domain graphitic materials from the reactor.

15. The method according to claim 14, further comprising the step of filtering polycyclic aromatic hydrocarbons before feeding the polycyclic aromatic hydrocarbons to the plasma reactor or another plasma reactor.

16. The method according to claim 14, wherein the polycyclic aromatic hydrocarbons are fed to the plasma reactor as the plasma gas.

17. The method according to claim 16, wherein the plasma reactor has at least two reaction chambers, further comprising the step of decomposing the hydrocarbon fuel a first reaction chamber and decomposing the polycyclic hydrocarbons in a second reaction chamber.

18. The method according to claim 14, wherein the polycyclic aromatic hydrocarbons are fed to another reactor as the plasma gas.

19. The method according to claim 14, wherein the plasma gas comprises hydrogen.

20. The method according to claim 14, wherein the polycyclic aromatic hydrocarbons are decomposed in the plasma arc zone.

* * * * *

UNITED STATES PATENT AND TRADEMARK OFFICE
CERTIFICATE OF CORRECTION

PATENT NO. : 7,462,343 B2  Page 1 of 1
APPLICATION NO. : 10/277134
DATED : December 9, 2008
INVENTOR(S) : Lynum et al.

It is certified that error appears in the above-identified patent and that said Letters Patent is hereby corrected as shown below:

On the title page, item [73]:
Please correct the name of the Assignee as follows: Delete "Kvafrner" and insert --Kvaerner-- therefor.

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,462,343 B2 | |
| APPLICATION NO. | : 10/277134 | |
| DATED | : December 9, 2008 | |
| INVENTOR(S) | : Steinar Lynum et al. | |

It is certified that error appears in the above-identified patent and that said Letters Patent is hereby corrected as shown below:

Col. 1 lines 4-5

Please replace paragraph 1 with the following paragraph 1:

This application is a continuation-in-part of prior application No. 09/400,530, filed 21 September 1999, which is a continuation of PCT/NO98/0093, filed 20 March 1998, which claims priority to Norway Patent Application No. 19971413, filed 25 March 1997.

Signed and Sealed this

First Day of March, 2011

David J. Kappos
*Director of the United States Patent and Trademark Office*